United States Patent
Kelley (10) Patent No.: US 7,957,384 B2
(45) Date of Patent: Jun. 7, 2011

(54) MULTIPLE VIRTUAL LOCAL AREA NETWORK DATABASES IN A SWITCH WITH A RELATIONAL LOOKUP ENGINE

(76) Inventor: James Madison Kelley, Saratoga, CA (US)

( * ) Notice: Subject to any disclaimer, the term of this patent is extended or adjusted under 35 U.S.C. 154(b) by 178 days.

(21) Appl. No.: 12/401,253

(22) Filed: Mar. 10, 2009

(65) Prior Publication Data
US 2009/0232139 A1 Sep. 17, 2009

Related U.S. Application Data

(60) Provisional application No. 61/035,649, filed on Mar. 11, 2008.

(51) Int. Cl.
*H04L 12/56* (2006.01)
(52) U.S. Cl. ........................ 370/392; 370/389
(58) Field of Classification Search .................. 370/389, 370/392, 229, 232; 717/176
See application file for complete search history.

(56) References Cited

U.S. PATENT DOCUMENTS

| | | | | |
|---|---|---|---|---|
| 5,790,546 A * | 8/1998 | Dobbins et al. | | 370/400 |
| 7,009,968 B2 * | 3/2006 | Ambe et al. | | 370/389 |
| 7,149,214 B2 * | 12/2006 | Wu et al. | | 370/389 |
| 7,266,818 B2 * | 9/2007 | Pike et al. | | 717/176 |
| 7,286,528 B1 * | 10/2007 | Pannell | | 370/389 |
| 7,376,080 B1 * | 5/2008 | Riddle et al. | | 370/229 |
| 7,492,763 B1 * | 2/2009 | Alexander, Jr. | | 370/389 |
| 7,561,571 B1 * | 7/2009 | Lovett et al. | | 370/392 |
| 7,580,356 B1 * | 8/2009 | Mishra et al. | | 370/230.1 |
| 7,639,613 B1 * | 12/2009 | Ghannadian et al. | | 370/232 |
| 7,760,719 B2 * | 7/2010 | Yik et al. | | 370/389 |
| 2006/0203815 A1 * | 9/2006 | Couillard | | 370/389 |
| 2008/0133494 A1 * | 6/2008 | Won-Kyoung et al. | | 707/4 |

* cited by examiner

Primary Examiner — Thong H Vu (57) ABSTRACT

An apparatus and method for transferring data through a network switch. The network switch comprises a plurality of ports each having at least one port identifier and associating with at least one virtual local area network (VLAN) database, and a relational lookup engine storing a plurality of relations between at least one media access control (MAC) address and the at least one port identifier. At least one port receives a frame of data comprising a destination MAC (DMAC) address and the relational lookup engine uses the DMAC address to retrieve an associated port identifier that identifies a port to which the frame is forwarded. A source MAC (SMAC) address of the frame is used to produce an input relation for the relational lookup engine to identify the associated port identifier that identifies the port that received the frame of data for learning associations between the ports and MAC addresses.

13 Claims, 10 Drawing Sheets

MAC Search (D,E,A,8) = {5,10,11}.I. {1,5,10,11,12}.I. {1,4,7,11,12}.I.{7,11}= {11}

FIG. 7

SP1 Output = {5,10,11}

SP2 Output = {7,11}

SP3 Output = {11}  ←——— Answer

MULTIPLE VIRTUAL LOCAL AREA NETWORK DATABASES IN A SWITCH WITH A RELATIONAL LOOKUP ENGINE

CROSS-REFERENCE TO RELATED APPLICATIONS

This application claims the benefit of provisional application Ser. No. 61/035,649 filed Mar. 11, 2008 by the present inventor and patent application Ser. No. 12/400,611 filed Mar. 9, 2008.

FEDERALLY SPONSORED RESEARCH

Not Applicable.

SEQUENCE LISTING OF PROGRAM

Not Applicable

BACKGROUND OF THE INVENTION

1. Technical Field of the Invention

The present invention relates in general to data communications. More specifically, the present invention relates to a network switch that has a relational lookup engine capable for both the port destination address look-up and the source address learning.

2. Description of the Related Art

A network switch performs switching functions in a data communication network. The switching function provided by the switch typically involves transferring information among entities of the network. Switched local area network (LAN) uses the network switch for filtering and forwarding data packets across network stations or other network nodes where each network node is connected to the network switch by a media. As the network switch functions as the traffic management system within the network, network switch is absolutely critical in the management of a computer network.

In order for the data to be transferred, it has become desirable for the switch to include a forwarding engine and associated media access control (MAC) address translation mechanism. U.S. Pat. No. 5,740,171 to Mazzola on Apr. 14, 1998 is an example of such an address translation mechanism that efficiently renders forwarding decisions for frames of data transported among ports of the network switch. The translation mechanism comprises a plurality of forwarding tables, each of which contains entries having unique index values that translate to selection signals for ports destined to receive the data frames wherein each port is associated with a unique index value and a VLAN identifier. The MAC address is combined with the VLAN identifier for searching the forwarding tables. Each table entry is directly accessed, however, by a key comprising a hash transformation of the MAC/VLAN quantity. The hash function used to find the index value maps a large address space into a much smaller address space. The problem with this type of address translation mechanism is that aliasing can occur. For example, a MAC address/VLAN pair can hash to the same table entry.

One solution to this limitation is disclosed in U.S. Pat. No. 6,266,705 to Ullum on Jul. 24, 2001 that includes a multi-page look up table and associated hashing technique. The MAC address and a VLAN identifier are transformed with a hash function to obtain a hash key. The hash key is an address pointing to a particular entry in the look up table. Similarly, U.S. Pat. No. 7,286,528 to Pannell on Oct. 23, 2007 provides an approach for address translation comprising the steps of hashing a destination MAC address of the frame, thereby producing a hashed MAC address and combining the hashed MAC address and the database number of the address database associated with the port that received the frame to produce a bucket address. Then identifying a plurality of bin addresses, wherein each of the bin addresses identifies a bin in the memory storing the MAC address and the port identifier that identifies one of the ports in the switch, searching the bins for a MAC address matching the destination MAC address, and transmitting the frame to the port identified by the port identifier stored in the bin storing a MAC address matching the destination MAC address. Such systems require bucket searches that are indeterminate in length and which are comparatively difficult to update and cannot be updated dynamically.

Hence, it can be seen, that there is a need for a network switch that eliminates the need to store MAC Addresses and Port Identifiers in bins and buckets. Further, the needed network switch directly accesses the port identifier by an input relation comprised of DBNUM and MAC address and reduces the overall data access time. The network switch would capable for both the destination address look-up and the source address learning. Further the network switch can be easily programmed to forward frame copies, to specified ports and to inhibit forwarding of undesirable frames.

SUMMARY OF THE INVENTION

To minimize the limitations found in the prior art, and to minimize other limitations that will be apparent upon the reading of the prior art, the present invention provides an apparatus for transferring data through a network switch having a relational lookup engine. The apparatus comprises a switch and a CPU, a plurality of ports each having at least one port identifier and associating with at least one virtual local area network (VLAN) database, and a relational processor that functions as the relational lookup engine storing a plurality of relations between at least one media access control (MAC) address and the at least one port identifier for a plurality of devices in communication with the network switch, wherein the at least one port receives at least one frame of data comprising a destination media access control (DMAC) address and the relational lookup engine uses the DMAC address to retrieve an associated port identifier that identifies a port to which the at least one frame of data is forwarded.

In another aspect of the present invention, a method in accordance with the present invention is a method for learning associations between a plurality of ports and a plurality of media access control (MAC) addresses in a network switch using a computer-readable media embodying instructions executable by a computer, comprising the steps of receiving at least one frame of data containing a source MAC (SMAC) address on at least one port, decomposing the SMAC address into a plurality of keys, mapping the plurality of keys to a unique memory location storing a port identifier, and identifying the at least one port that received the at least one frame of data.

OBJECTS AND ADVANTAGES

One objective of the invention is to provide a network switch having a relational lookup engine that eliminates the need to store a plurality of media access control (MAC) addresses and database numbers (DBNUM) in memory, the need to hash the DBNUM, DMAC, and to perform search and comparisons to verify the correct entry in a hash bucket and to eliminate the overhead of maintaining hash tables.

A second objective of the invention is to alternatively provide a network switch that does not require any extra memory for VLAN database by storing the forwarding information in the associate.

A third objective of the invention is to provide a network switch that can be implemented for storing a port identifier at a memory location corresponding to an associate.

A fourth objective of the invention is to provide a network switch that forms a input relation comprised of a media access control (MAC) address and a database number (DBNUM) such that a relational lookup engine can retrieve the corresponding unique associate that can be used to retrieve the destination port identifier port identifier so that the frame of data is transmitted to the port identified by the port identifier.

A fifth objective of the invention is to provide for rapid update of the VLAN Database as network conditions change.

A sixth objective of the invention is to provide a relational lookup engine that can be reprogrammed to make packet flow control decisions.

A seventh objective of the invention is to provide a relational lookup engine that permits the MAC addresses associated with the port identifiers to be dynamically updated.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features.

Figure 1:
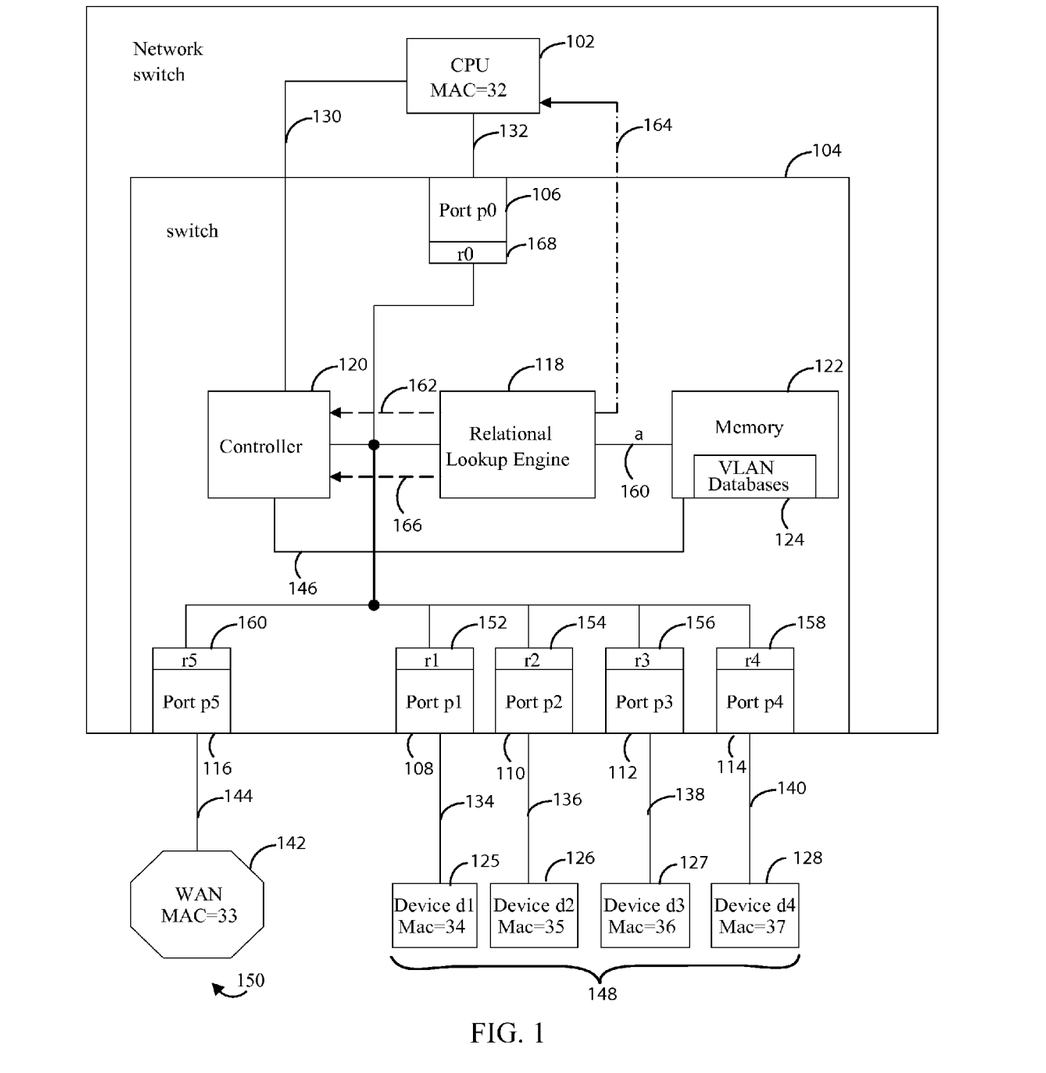
FIG. 1 is a block diagram of the present invention showing a network switch.

FIG. 1 shows a block diagram of the present invention showing a network switch 100. The network switch 100 includes a CPU 102 and a switch 104 having a plurality of ports 106, 108, 110, 112, 114, and 116, a relational processor (RP) that functions as a relational lookup engine 118, a controller 120, and a memory 122. The plurality of ports includes ports p0, p1, p2, p3, p4, and p5 generally indicated as 106, 108, 110, 112, 114, and 116 each of which has at least one port identifier and associates with at least one virtual local area network (VLAN) database 124 wherein each VLAN database 124 has a unique database number. The relational lookup engine 118 stores a plurality of relations between at least one media access control (MAC) address and the at least one port identifier for a plurality of devices 125, 126, 127, and 128 in communication with the network switch 100. Each of the switch 104 and CPU 102 can be implemented as an integrated circuit. The CPU 102 exchanges a plurality of control signals (not shown) with the switch 104 over a control channel 130, and exchanges a data with the port p0 106 over a data channel 132. The ports p1 through p4 (108, 110, 112, and 114) exchange the data with the plurality of devices d1, d2, d3, and d4 (125, 126, 127, and 128) over a plurality of channels c1, c2, c3, and c4 (134.136, 138 and 140) respectively. The port p5 116 exchanges the data with a wide area network (WAN) 142 over a channel c5 144. The controller 120 and lookup engine 118 can be implemented together as a single processor, or as two or more separate processors.

Figure 2:
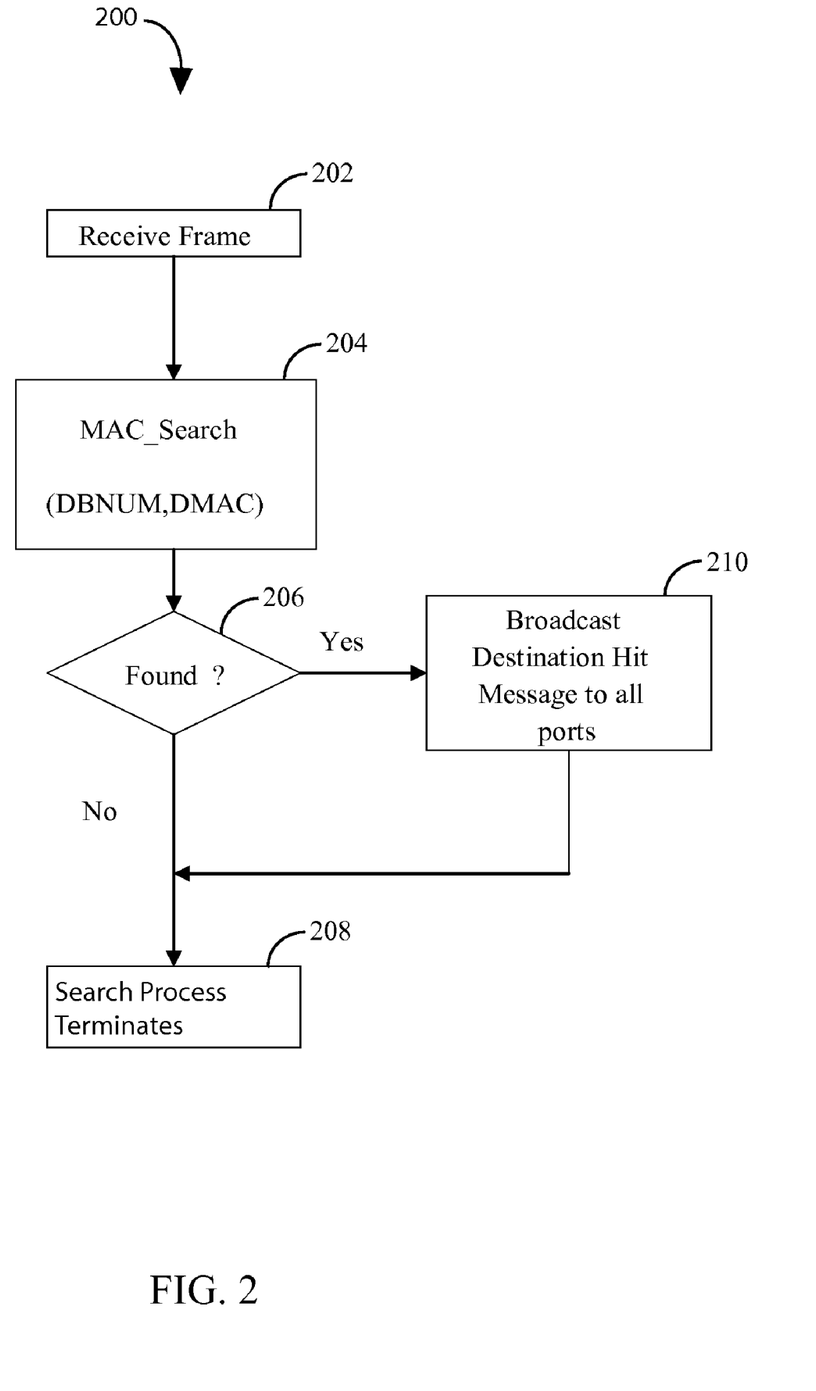
FIG. 2 is an operational flow chart illustrating a translation process using a relational lookup engine.

FIG. 2 shows an operational flow chart illustrating a translation process 200 using the relational lookup engine 118. The switch receives a frame of data on at least one port as indicated at block 202. The switch transfers a destination MAC (DMAC) address of the frame, and an associated database number (DBNUM) from a port register of a port that received the frame, to the relational lookup engine. The relational lookup engine then combines the DMAC address and DBNUM to produce a relation. In a preferred embodiment, the relational lookup engine outputs an associate that contains a memory address to a forwarding table or a unique index with destination port number and related information. Therefore multiple entries can occur for a single MAC address but there is a unique mapping for each input relational instance a 160, i.e., "a"=MAC (DMAC, DBNUM). If the port information is included in the associate then the memory at 122 is not required and the VLAN databases 124 are included in 118.

Further, the relational lookup engine searches for a match to the DMAC address of the frame as indicated at block 204. The relational lookup engine checks whether the match is found as indicated at block 206. If no match is found, the search process ends as indicated at block 208. When the port that received the frame receives no response after a predetermined period, the port simply floods the frame to all of the other plurality of ports in the switch. If the match is found in the database, a "match signal" is sent to the controller. Upon receiving the "match signal", the controller broadcasts a hit message including a hit indication (indicating a successful translation), a port identifier of the port that received the frame (the SPID), and the port identifier stored in the memory corresponding to the MAC address which is a destination port identifier (DPID) to all the plurality of ports in the switch as indicated at block 210. Then the translation process 200 ends as indicated at block 208. The port that received the frame recognizes the hit message by the DPID contained therein, and then transmits the frame to the port identified by the DPID in the hit message.

Referring to FIG. 1, the relational lookup engine 118 eliminates the need to store the MAC addresses and database numbers in the memory 122. This also eliminates the need to hash the DBNUM, DMAC and to perform comparisons to verify a correct entry in a hash bucket. Insertions, deletions and search operations with the relational lookup engine 118 are deterministic. Insertion and deletion of entries in the VLAN database 124 can be performed by the controller 120 under the direction of the CPU 102 which sends simple commands via the control channel 130. Moreover, no extra memory 122 is required for VLAN database 124 since the database number and MAC address for each entry are not stored in the memory 122. The entry in the memory 122 is read or written on a controller bus 146. Each entry in the VLAN database 124 stores an entry state (ES) of the entry and a port identifier (Port ID). The ES includes information describing the entry such as age, lock state, etc. The Port ID may be a port number or a port vector that represents a single port.

In the preferred embodiment "a" 160 is a pointer to a location in the memory 122 which contains a port identifier. If a match for required entry is in the VLAN database 124, then only the pointer "a" 160 is an output. If no matching entry is found then a "no match" signal 162 is sent to the controller 120, then the relational lookup engine 118 checks to see if any memory locations are unlocked. If all of the memory locations are locked, then the relational lookup engine 118 sends a "Memory full" interrupt signal 164 to the CPU 102, which takes corrective action. However, if the match is found, a "match" signal 166 is sent to the controller 120.

The network switch 100 has two VLANs as VLAN A 148 and VLAN B 150. VLAN A 148 consists of the plurality of devices d1 through d4 (125, 126, 127, and 128) and VLAN B 150 consists of the WAN 142 such that the data is exchanged between the VLANs only through the CPU 102. The MAC address of a device or network served by the switch 104 is associated with the plurality of ports 106, 108, 110, 112, 114, and 116 within the switch 104. Assume that the CPU 102 has MAC address 32, WAN 142 has MAC address 33, and devices d1 through d4 (125, 126, 127, and 128) have MAC addresses 34 through 37, respectively. Separate VLAN databases are assigned to VLAN A 148 and VLAN B 150. Thus a VLAN database number (DBNUM) describes each VLAN database 124. The number of possible VLAN databases 124 is limited only by the number of bits in the DBNUM. In the preferred embodiment, DBNUM has 8 bits, thus 256 VLAN databases 124 are possible. DBNUM=0 is assigned to VLAN A 148 and DBNUM=1 is assigned to VLAN B 150.

Each of port registers r1 through r5 (152, 154, 156, 158, and 160) is loaded with a DBNUM indicating a database number for that port. Default DBNUMs can be loaded into the port registers r1 through r5 (152, 154, 156, 158, and 160) during power-up reset of the network switch 100. This can be done in a software by the CPU 102 or by other means. In the example, the WAN 142 belongs to VLAN B 150, therefore DBNUM=1 is loaded into the port register r5 160. Each of local area network (LAN) devices d1 through d4 (125, 126, 127, and 128) belongs to VLAN A 148, therefore DBNUM=0 is loaded into each of the port registers r1 through r4 (152, 154, 156, and 158). The CPU 102 belongs to both VLAN A 148 and VLAN B 150, so the CPU 102 changes the DBNUM in a port register r0 168 based on a destination port of the frame.

In one embodiment, the CPU 102 includes a buffer for the each VLAN database 124, and executes a direct memory access (DMA) process that changes the DBNUM in the port register r0 168 using a control channel before changing buffers. While the DMA process transmits the contents of one of the buffers to the switch 104, CPU 102 fills the other buffers for later transmission to the switch 104. When a buffer empties, the CPU 102 writes a different DBNUM to the port register r0 168 and the DMA process begins to transmit from the buffer for that DBNUM.

In another embodiment, the CPU 102 has only one buffer that transmits frames for all of the VLAN databases 124 in the switch 104. According to this embodiment, some or all of the frames include a field that contains a DBNUM. When the switch 104 receives such a frame, it writes the DBNUM to the CPU port register r0 168. In some other embodiments, the field is a trailer in a frame for one VLAN database 124 followed by one or more frames for a different VLAN database 124. In other embodiments, the field is a header in a frame for one VLAN database 124 that is preceded by a frame for a different VLAN database 124. In some embodiments, the field is transmitted in a null frame that is transmitted between frames for different VLAN databases 124. Such a null frame can be used to initialize the port register r0 168 in any of these embodiments.

Figure 3:
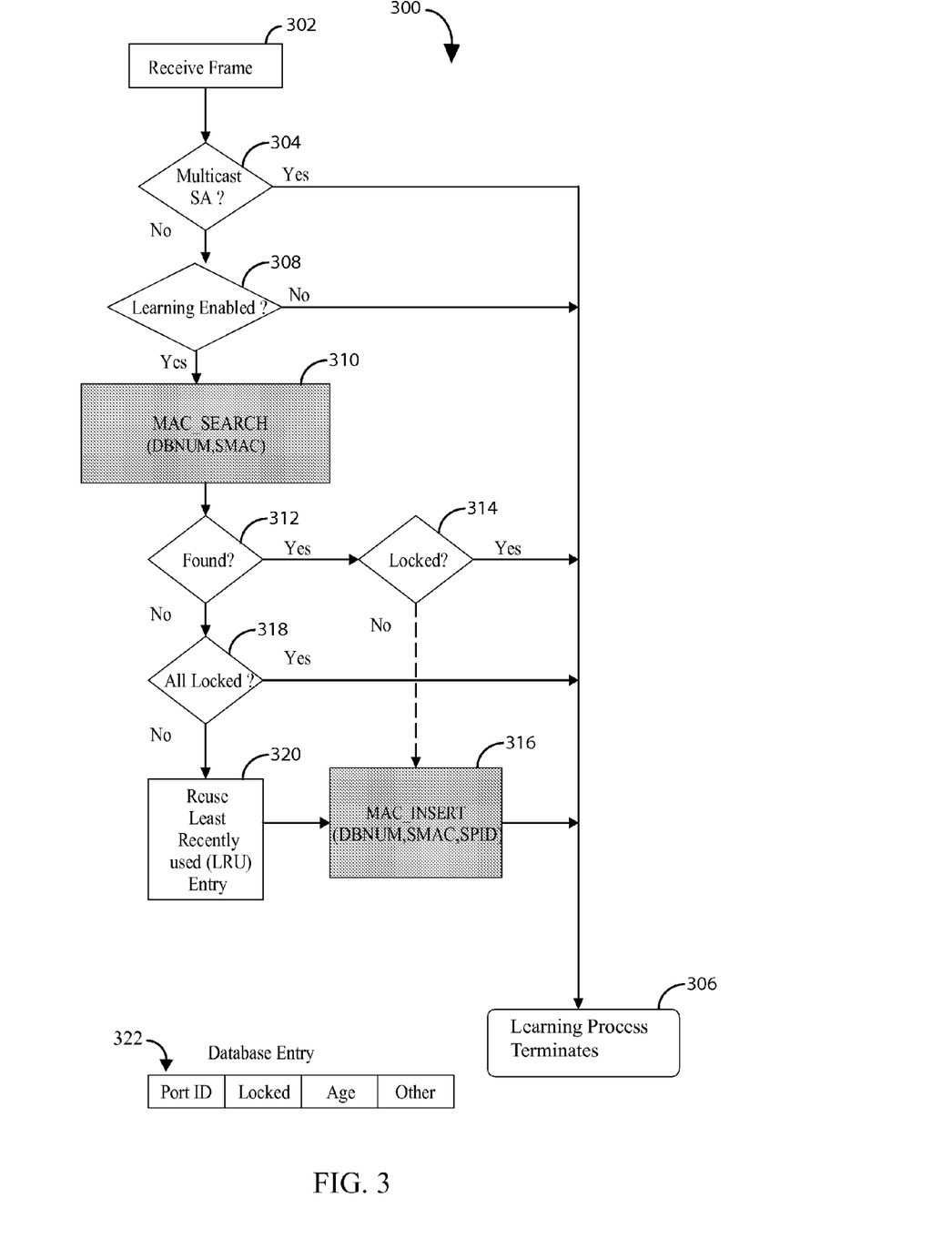
FIG. 3 is an operational flow chart illustrating a learning process using the relational lookup engine.

FIG. 3 is an operational flow chart illustrating a learning process 300 using the relational lookup engine 118. A source MAC (SMAC) address of the frame is utilized for the learning process 300. The switch receives the frame of data on at least one port as indicated at block 302. Then the switch determines whether the SMAC address of the frame is a multi cast source address or not as indicated at block 304. If so, the learning process terminates as indicated at block 306, since the switch will not learn with the multicast source addresses. If the frame does not contain a multicast source address, the switch determines whether learning is enabled as indicated at block 308. The CPU can disable learning using the control channel. If learning is disabled, the learning process terminates as indicated at block 306. If learning is enabled, the switch transfers the SMAC of the frame and the DBNUM from the port register of the port that received the frame, to the relational lookup engine.

The lookup engine then combines the SMAC address and the DBNUM to form a relation as indicated at block 310. The same lookup method is used for both a destination address lookup and SMAC address learning. Therefore, the lookup engine stores the DPID in the memory along with the entry state (ES) information. Many types of source port identifiers can be used, such as the port number or a port vector. A port vector is preferred because it is more compact.

The lookup engine produces a pointer "a" that identifies a corresponding memory location in the VLAN database storing a port identifier and an ES state information. In the preferred embodiment, there is no need for the relational lookup engine to search for a MAC address because it is implicit in the relation and the relational lookup engine will produce a pointer if there is a "match" or a "no match" condition. There is no aliasing as in hash implementations. The relational lookup engine checks whether the match is found as indicated at block 312. If a match is found, the relational lookup engine determines whether a matching entry is locked as indicated at block 314. Entries may be locked only by the CPU. Locked entries are persistent because they never age, and so are never overwritten. If the matching entry is locked, then the learning process ends as indicated at block 306. If not, the Relational Lookup Engine reallocates the pointer "a" and a source port vector (SPV) of the port that received the frame, and the source MAC (SMAC) address of that frame as indicated at block 316. Then the learning process ends as indicated at block 306. However, if no match is found, then the relational lookup engine checks to see if any memory locations are unlocked as indicated at block 318. If all of the memory locations are locked, then the relational lookup engine sends a "memory full" interrupt signal to the CPU, which takes corrective action. The CPU can then decide to what entries in memory to delete or whether to flush then re-build the database, then the learning process ends as indicated at block 306. If any locations in memory are unlocked, then the relational lookup engine selects an oldest entry by examining the ES, which contains a time stamp for a time last used as indicated at block 320. A least recently used (LRU) entry is replaced by assigning its pointer "a" to a new entry. The relational lookup engine binds the new relation (DBNUM, SMAC) to "a" and then the controller writes to the source port vector (SPID) of the port that received the frame along with the entry state information into the memory as indicated at block 316. Then learning process ends as indicated at block 306. The entry may be Port ID, locked, age, other, or the like as indicated at block 322. Thus the learning process populates a VLAN database with its associated ports.

Figure 4:
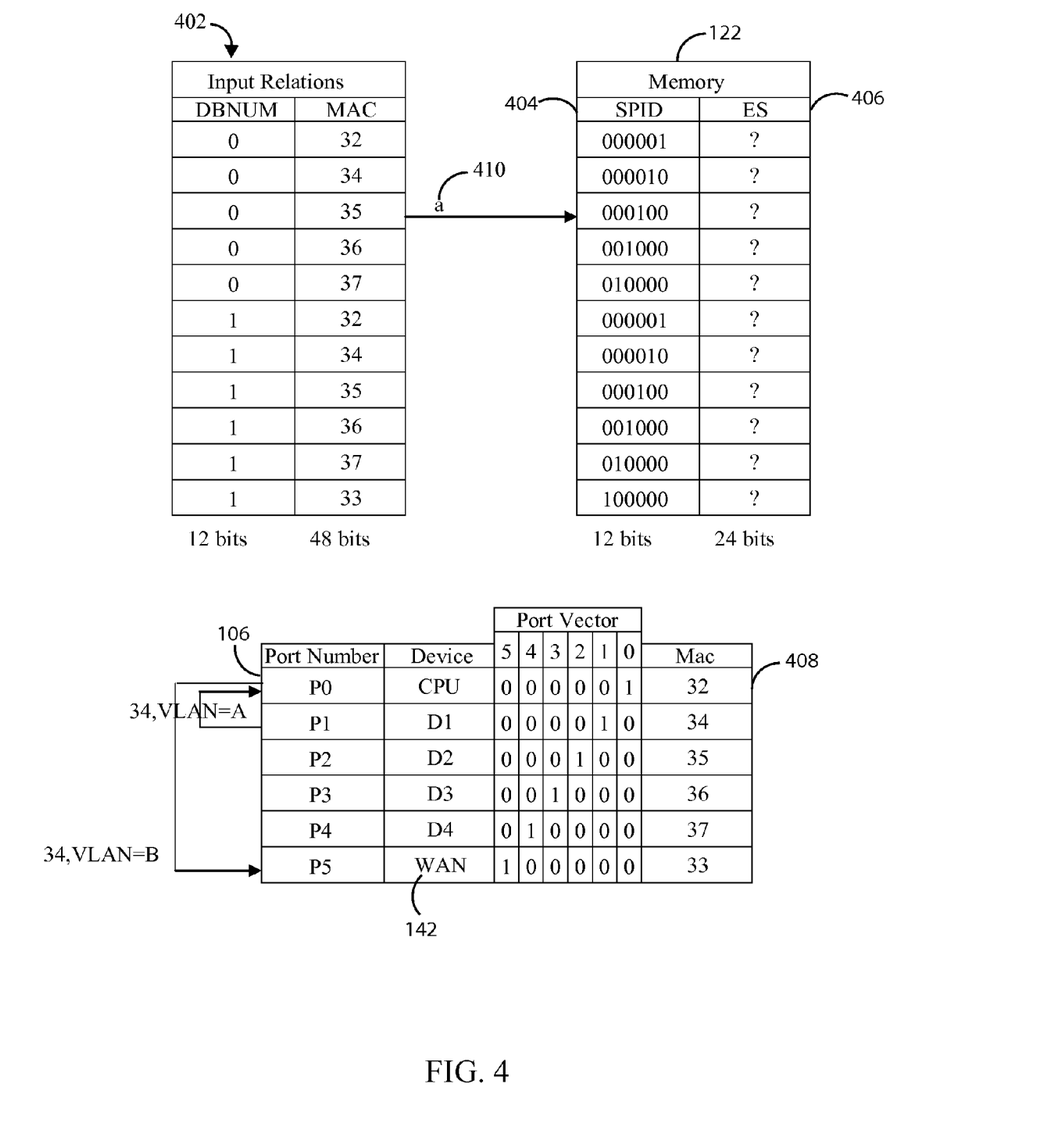
FIG. 4 is a schematic diagram illustrating a virtual local area network (VLAN) mapping from a plurality of input relational instances to a memory.

FIG. 4 is a schematic diagram illustrating VLAN mapping from a plurality of input relational instances 402 to the memory 122. Although, there is generally at least one database of MAC addresses associated with each port, FIG. 4 shows two databases for simplicity of explanation. The input relational instances 402 include at least eleven relations each associated to a separate pointer "a" 410 that points to a memory location where the SPID 404 and the age ES 406 may be stored. Each relational instance (DBNUM, MAC) 402 has one entry in the memory location pointed by its pointer "a" 410. The CPU 102 has MAC address 32 indicated as 408 and is associated with the port 0 106 in both the VLANs (148 and 150). Therefore the CPU 102 is associated with the port 0 106 in both databases. The WAN 142 (MAC address 33) exists only in VLAN B 150, where it is associated with the port 5 116 and so has no port association in database 0. In this case, the empty location is available for other MAC addresses from any database number since each database number is independent. Each of the LAN devices d1 through d4 (125, 126, 127, and 128) is associated with a respective one of ports p1 through p4 (108, 110, 112, and 114) in the database 0 (VLAN A 148), and is associated with the CPU port p0 106 in the VLAN B 150.

Figure 5:
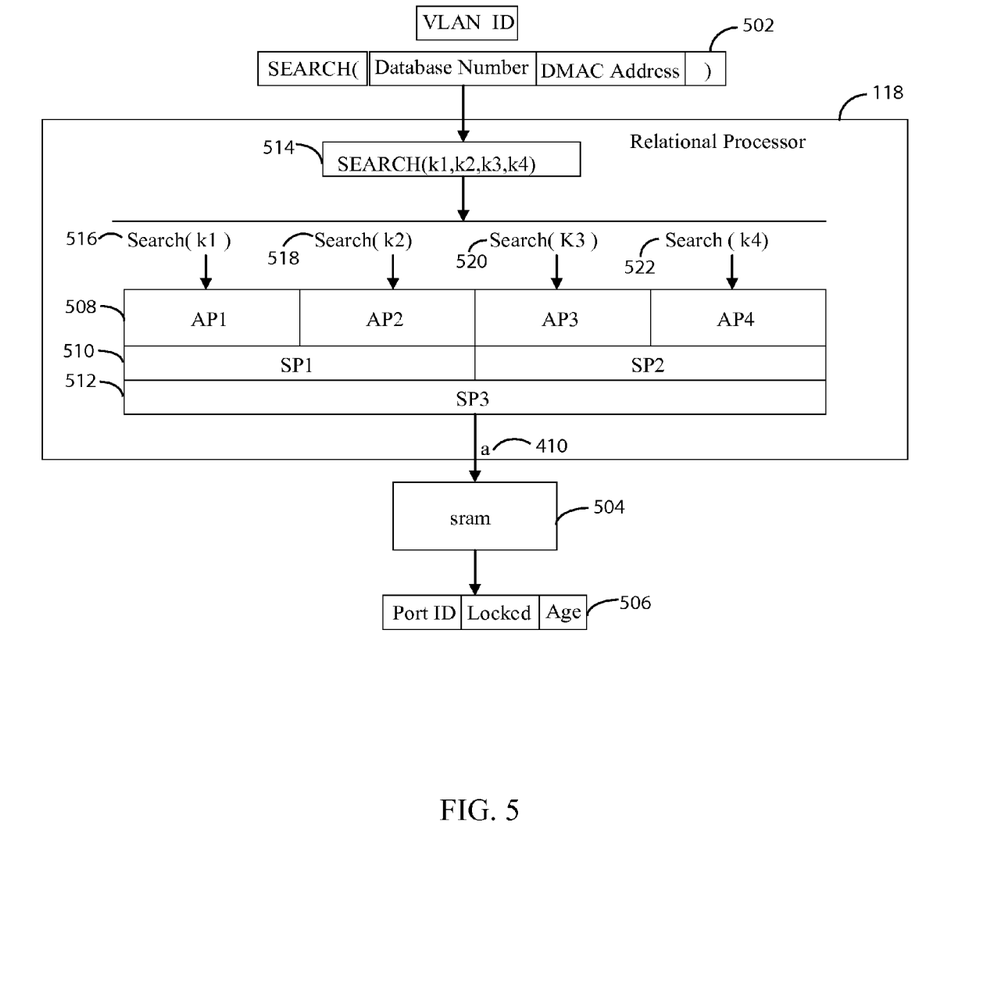
FIG. 5 is a block diagram illustrating a VLAN search configured to lookup a forwarding information from a SRAM using an input search key.

FIG. 5 is a block diagram representation of a Relational Lookup Engine configured to lookup forwarding information from a SRAM 504 using an input search key 502. The database number (VLAN ID) and the MAC address causes the pointer "a" 410 to be retrieved that permits a forwarding table 506 to be accessed so that port ID, age of entry, etc are obtained. This particular example has four associate processors (AP) 508 and three set processors (SP) (510 and 512) and does not use an associate switch. It divides the input search key 502 into four machine keys k1, k2, k3 and k4 generally indicated as 514 and performs the four search operations in parallel. The search (k1) 516 is input to the AP1, search (k2) 518 is input to the AP2, search (k3) 520 is input to the AP3, and search (k4) 522 is input to the AP4 where autonomous searches take place. SP1 and SP2 510 perform intersection operations on a plurality of associate sets output by the AP array thereby reducing an output set. The SP3 512 reduces next output set size to the final result associate that is one associate or none. The final result associate (if there is one) is used to recover the forwarding information from the SRAM 504. This is provided by way of example. A Relational Lookup Engine 118 for MAC search engine may be comprised of one or more associate processors and one or more set processors.

Embodiments of the present invention provide a two-way mapping between the input relational instances 160 and VLAN databases 124. For example, to determine the VLAN database 124 in which a MAC address appears, only need to specify a search on domain 2 (MAC) of the relation and the relational lookup engine 118 will produce all of the VLAN databases that contain the required MAC address.

Figure 6:
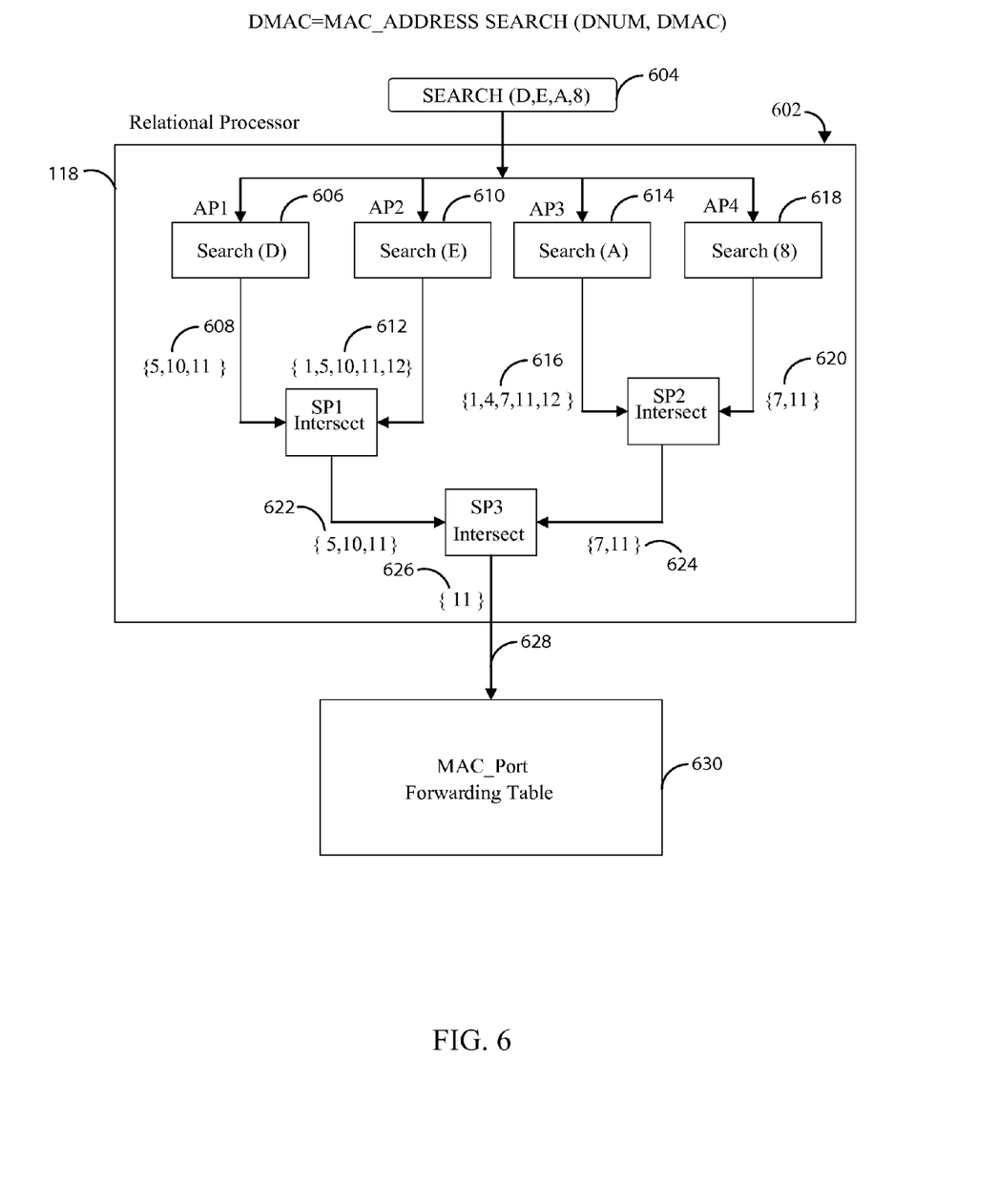
FIG. 6 is a block diagram illustrating a VLAN search being performed on a relational processor (RP) against a database.
Figure 7:
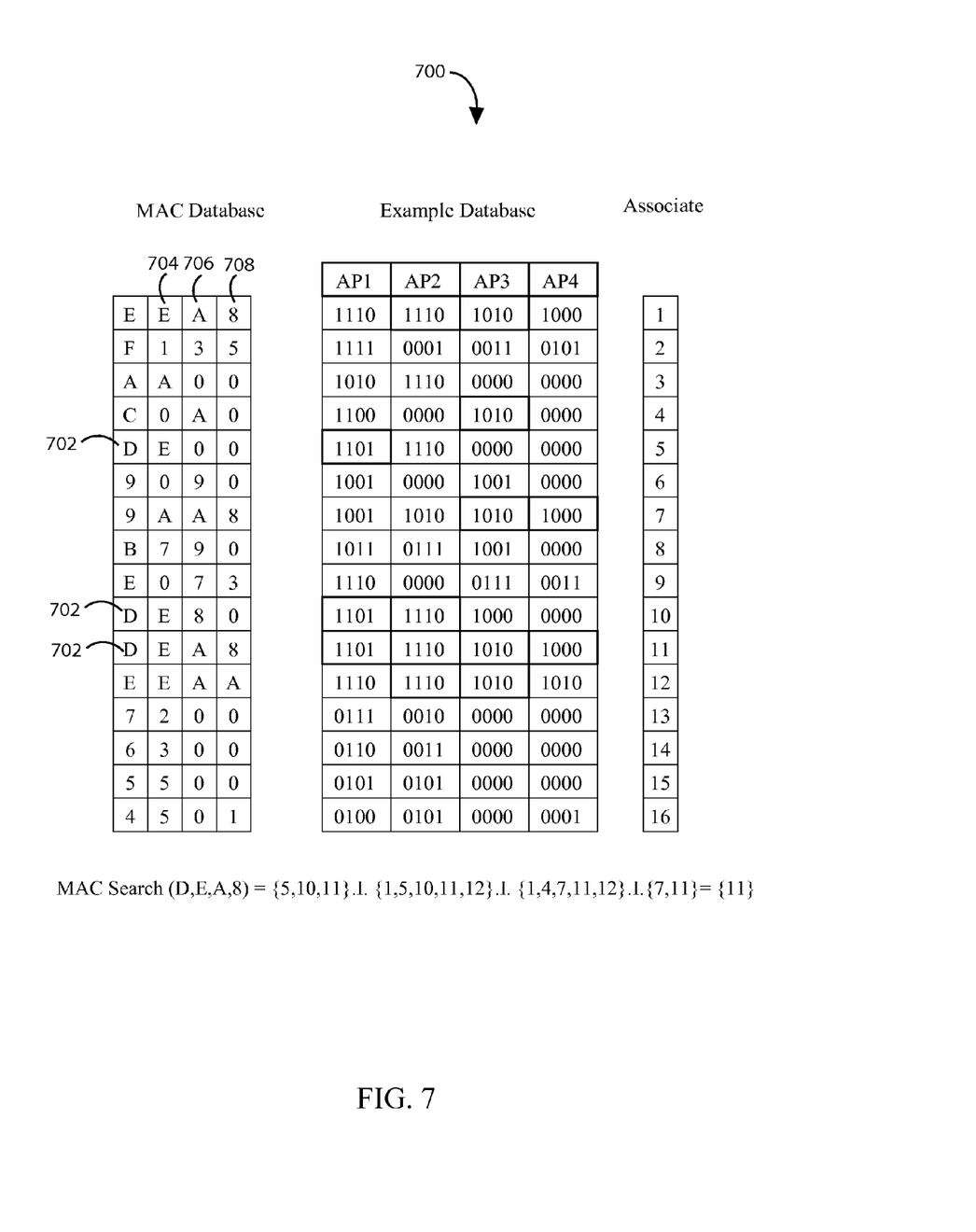
FIG. 7 is a schematic diagram illustrating an example media access control (MAC) database.

FIG. 6 is a block diagram illustrating the VLAN search being performed on the Relational Lookup Engine 118 that utilizes a "Sieve Architecture" 602 against a database 700 shown in FIG. 7. The "Sieve Architecture" 602 permits the elimination of a cross-point switch to interconnect AP1, AP2, AP3, and AP4 508 to the set processors SP1, SP2 510 and the final set processor SP3 512.

A search (D, E, A, 8) 604 is being performed on Relational Lookup Engine 118 to determine whether 702 is stored in the database 700 or not. If 702 is stored in the Relational Lookup Engine 118, then an associated destination port address and other flow control information can be accessed. Four associate processors (AP1, AP2, AP3, and AP4) 508 are used to interrogate the database 700 shown in FIG. 7. The RP 118 decomposes the search (D, E, A, 8) 604 into search (D) 606, search (E) 610, search (A) 614, and search (8) 618. Search (D) 606 on AP1 produces {5, 10, 11} 608 that can be verified by examining the AP1 column at D 702 on FIG. 7. Search (E) 610 on AP2 produces {1, 5, 10, 11, 12} 612 that can be verified by examining the AP2 column at E 704 on FIG. 7. Search (A) 614 on AP3 produces {1, 4, 7, 11, 12} 616 that can be verified by examining the AP3 column at A 706 on FIG. 7. Search (8) 618 on AP4 produces {7, 11} 620 that can be verified by examining the AP4 column at 8 708 on FIG. 7. A search result of a SP1 intersection operation is {5, 10, 11} 622 and a result of a SP2 intersection operation is {7, 11} 624. A result of the SP3 intersection operation is {11} 626, this represents an output associate corresponding to the search (D, E, A, 8) 604. This associate contains an index 628 into the MAC port forwarding table 630 so that forwarding information is obtained.

Figure 8:
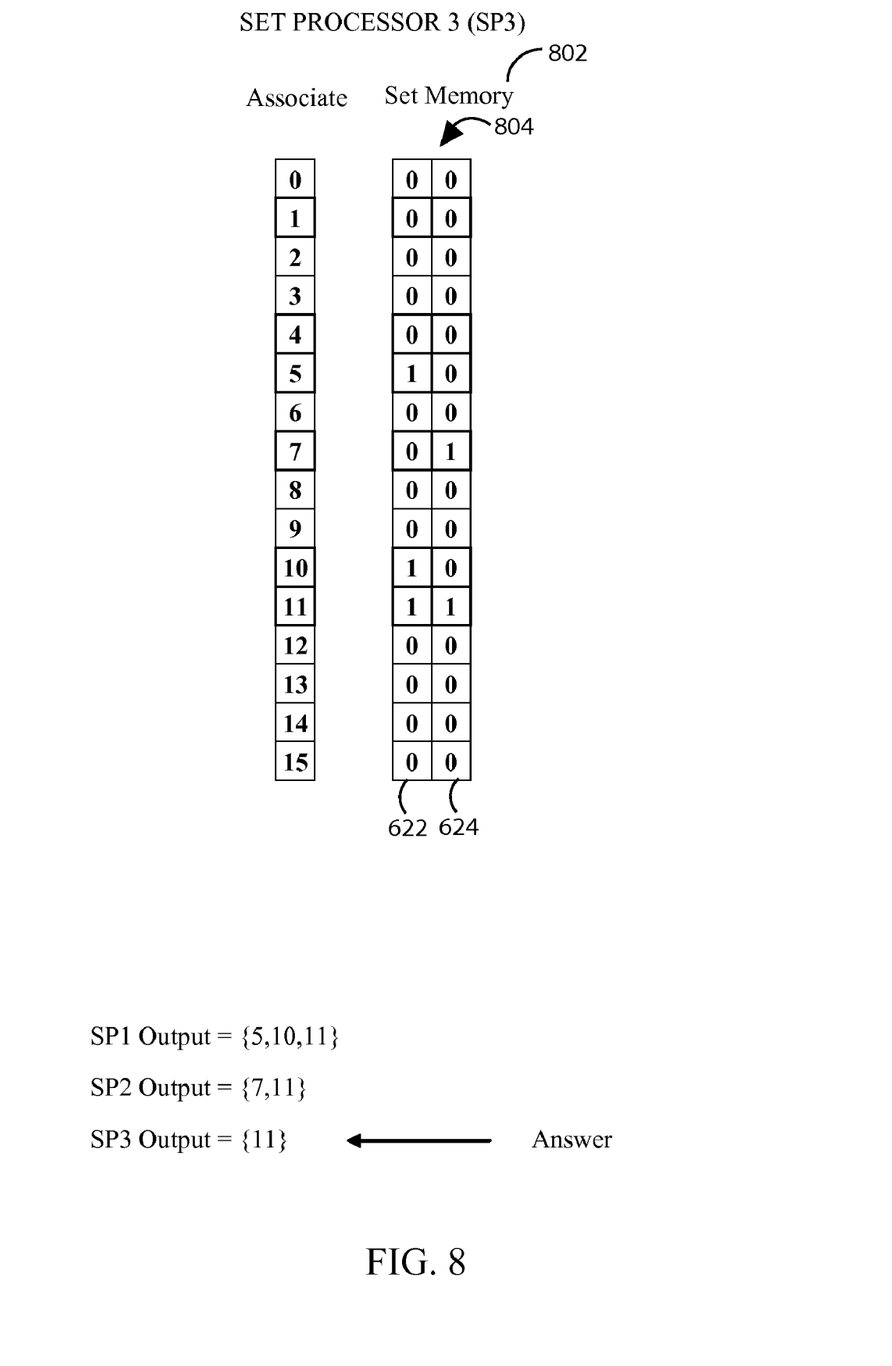
FIG. 8 is a schematic diagram illustrating a plurality of bits sets in a set memory of a set processor 3.

FIG. 8 shows a plurality of bits 804 sets in a set memory 802 of the SP3 512 as a result of the SP1 intersection operation {5, 10, 11} 622 and the SP2 intersection operation {7, 11} 624 which are connected to form a "sieve" with the SP3 512. The SP3 512 determines a final correct output result {11} 626 by performing the intersection operation on two input sets (622, 624). The search operation can take place on 48-bit and 64-bit addresses (Keys) in full implementations. The Set Memory is a two dimensional bit vector that has as at least many entries as there are there are forwarding entries.

Figure 9A:
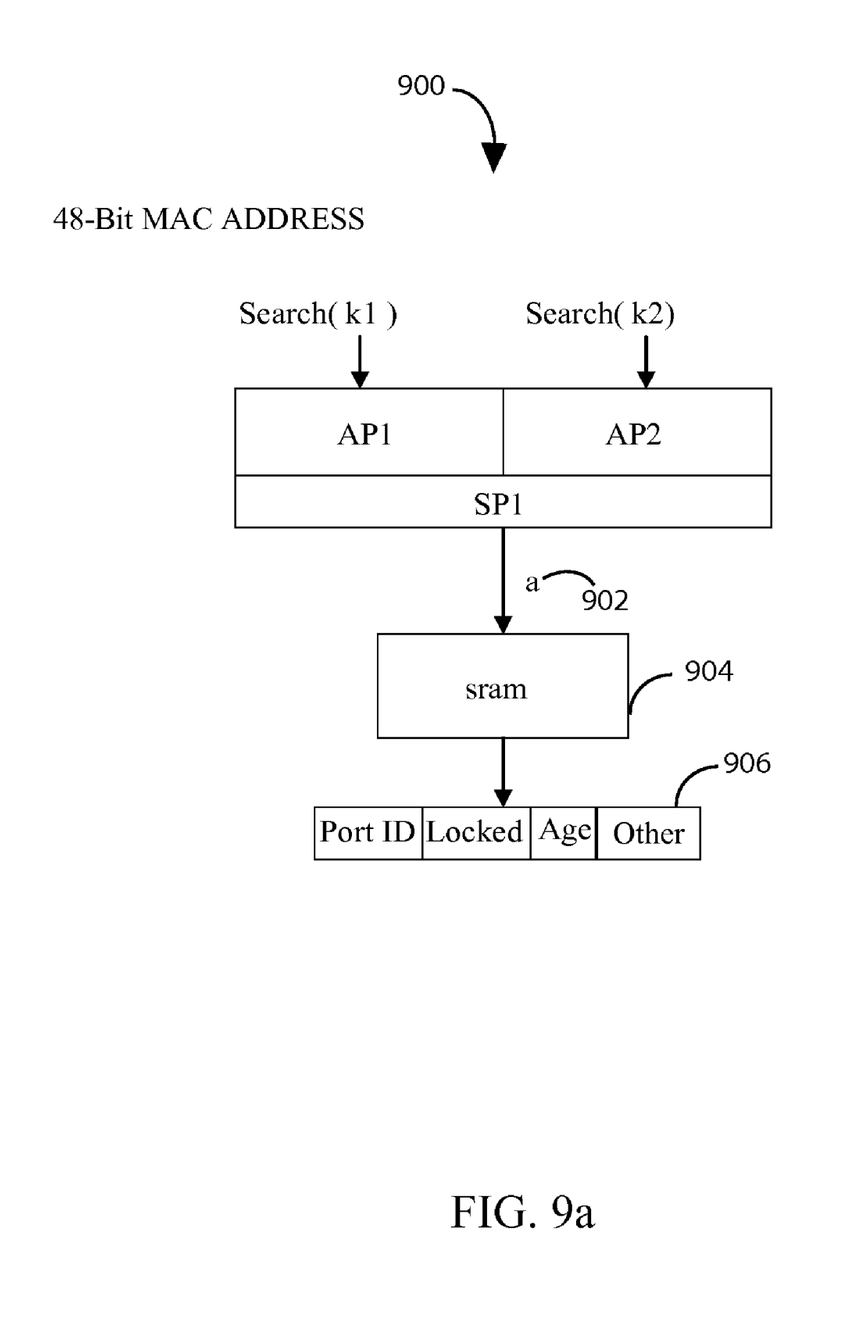
FIG. 9a is a schematic diagram illustrating a 48 bit MAC address configuration of the relational processor configured to perform a 2 dimensional search.
Figure 9B:
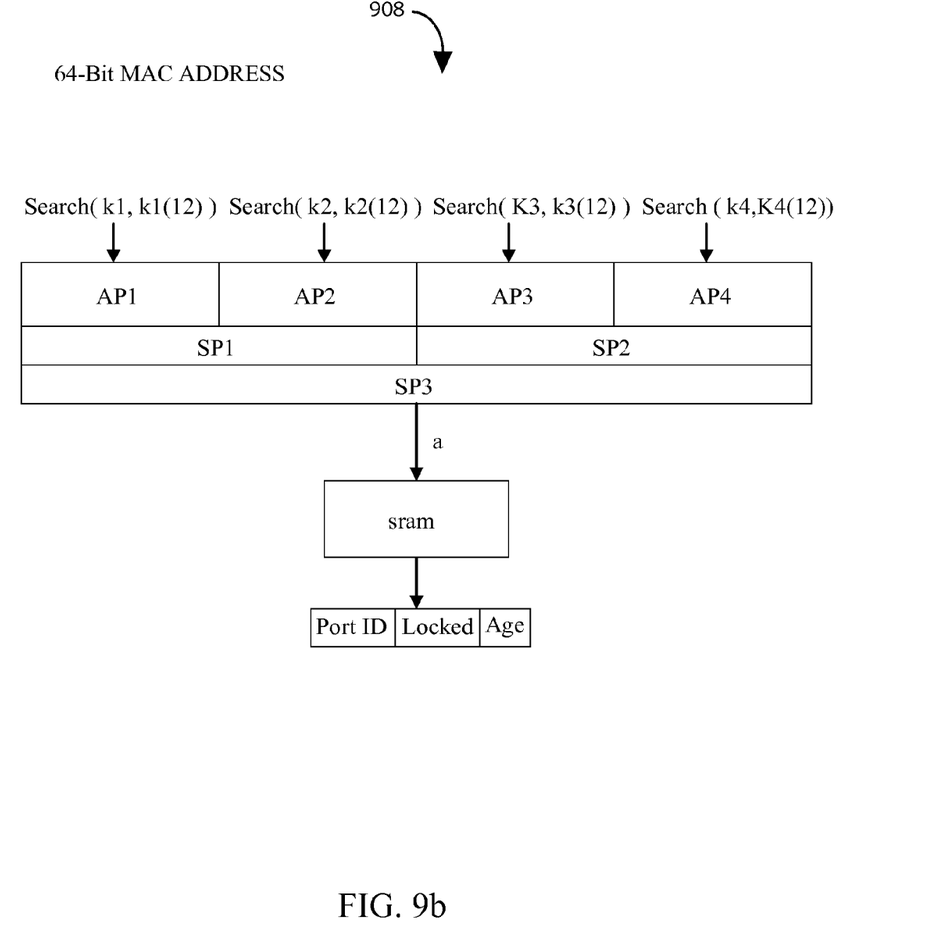
FIG. 9b is a schematic diagram illustrating a 64 bit MAC address configuration of the relational processor configured to perform a multi dimensional search.

FIG. 9a is a schematic diagram illustrating a 48 bit MAC address configuration of the relational processor 118 configured to perform a 2 dimensional search 900. In this simple case, an associate "a" 902 which is an output by the SP 1 contains an index into an SRAM memory 904 that contains routing information 906 such as port ID, age, status, etc. FIG. 9b shows a schematic diagram illustrating a 64 bit MAC address configuration of the relational processor 118 configured to perform a multi dimensional search 908.

Because the input to the relational lookup engine is a relation it is simple to reprogram the switch to recognize other factors affecting the network switch as it selects the input and outputs ports. This is effected by adding additional status fields to the input relation. The effect of this is to permit alternate configurations of the VLAN based on user prescribed conditions.

The MAC entries in the VLAN databases can be dynamically updated as new devices are added to a port or removed from ports. Further the switch can be used to block access to the LAN or WAN by devices having specific MAC addresses. The Relational Lookup Engine allows insertion of new relations and deletion of old relations without interfering with the ongoing operation of the switch. This is a highly desirable capability that neither, hash nor CAM implementations possess.

The foregoing description of the preferred embodiment of the present invention has been presented for the purpose of illustration and description. It is not intended to be exhaustive or to limit the invention to the precise form disclosed. The Relational lookup engine is programmable and that permits many varied uses. Many modifications and variations are possible in light of the above teachings. It is intended that the scope of the present invention not be limited by this detailed description, but by the claims and the equivalents to the claims appended hereto.

What is claimed is:

1. An apparatus for transferring data through a network switch, comprising:
   a. a plurality of ports;
   b. receiving a frame of the data on one of the ports, the frame including a destination MAC address (DMAC);
   c. forming an input relation comprised of the destination MAC address (DMAC) and the database number (DBNUM) of the port that received the frame;
   d. a relational lookup engine storing a plurality of address databases as associates {a} based on input relations comprised of the MAC addresses and database numbers (DBNUM) for devices in communication with the network switch where each unique input relation is mapped to a unique associate; where the relational lookup engine is comprised of
      i. two or more Associate Processors, and
      ii. at least one Set Processor
   e. inputting an input relation in the relational lookup engine to retrieve the associate a;
      wherein the associate a is comprised of the destination port identifier or a pointer to a memory that stores at least the port identifier;
   f. transmitting the frame to the destination port identified by the port identifier; whereby the incoming frame of data is routed to the output port that is attached to a receiving device that has a MAC address that matches the destination MAC address contained in the frame.

2. The apparatus of claim 1, where inputting an input relation to the relational lookup engine creates a mapping to a unique associate a if one does not already exist for that input relation.

3. The apparatus of claim 1, wherein the relational lookup engine is implemented in a semiconductor or programmable logic device.

4. The apparatus of claim 1, where inputting an input relation in the relational lookup engine deletes the mapping to a unique associate a.

5. The apparatus of claim 1, further comprising; a CPU and a plurality of port registers each assigned to one of the ports;
   a. the port registers can be loaded with a default DBNUM at power on or thereafter by the CPU or by other means;
   b. the CPU can access any port and the controller;
   c. the controller can receive a signal from a particular port or the CPU that identifies a particular address database number; and stores the particular address database number in the port register corresponding to the particular port; and transmits frames received on the particular port according to the address database number stored in the port register for the particular port.

6. The apparatus of claim 1, wherein the relational lookup engine is implemented in software or firmware stored in non transitory computer-readable media embodying instructions executable by a computer or a controller.

7. A method for transferring data through a network switch having a plurality of ports and a relational algorithm for storing a plurality of associates {a} such that each input relation is mapped to a unique associate a that allows at least one port identifier to be retrieved for each input relation, including the steps of
   a. receiving a frame of data on a port of the switch, the port associated with one of the MAC address databases having a database number (DNUM), the frame including a destination media access control address (DMAC);
   b. forming the input relation comprised of the DMAC address and the database number DNUM;
   c. inputting the input relation into a relational lookup algorithm capable retrieving a unique associate a based on the input relation for a device in communication with the network switch; where the relational lookup algorithm is comprised of
      i. two or more Associate Processes, and
      ii. at least one Set Process;
   d. inputting an input relation in the relational lookup engine to retrieve the associate wherein the associate is comprised of the destination port identifier or a pointer to a memory that stores at least the port identifier;
   e. retrieving the port identifier that identifies at least one destination port in the network switch using the associate a;
   f. transmitting the frame of data to the port identified by the port identifier;
   whereby the incoming frame of data is routed to the output port that is attached to a receiving device that has a MAC address that matches the destination MAC address contained in the frame.

8. The method of claim 7, where inputting an input relation to the relational lookup engine creates a mapping to a unique associate a if one does not already exist for that input relation.

9. The method of claim 7, where inputting an input relation in the relational lookup engine deletes the mapping to a unique associate a.

10. The method of claim 7, wherein the associate contains a forward copy bit that causes the frame to be sent to the two ports, one of which is the destination port and the other a default port.

11. The method of claim 7, wherein the associate contains a deny bit that causes the frame to be discarded.

12. The method of claim 7, wherein the associate contains the destination port ID that causes the frame to be forwarded.

13. The method of claim 7, comprising:
   a. receiving a frame of data on a port of the switch, the frame including a source MAC address (SMAC);
   b. forming an input relation comprised of the source MAC address (SMAC) and the Database Number (DBNUM);
   c. inputting the input relation to the relational lookup algorithm and
      i. if there is a "no match" condition and no a is produced, creating a mapping to a unique a;
      ii. if there is a "match" condition an a is produced;
      iii. in the source port ID is updated;
   wherein the forwarding information comprised of the port ID associated with the new SMAC is stored in the associate a or VLAN memory;
   whereby the MAC address database associated with the port can populated with the MAC addresses of devices that are attached to that port.

* * * * *